J. O. HOFBAUER.
WIND SHIELD.
APPLICATION FILED FEB. 10, 1911.
1,018,973.
Patented Feb. 27, 1912.
2 SHEETS—SHEET 2.
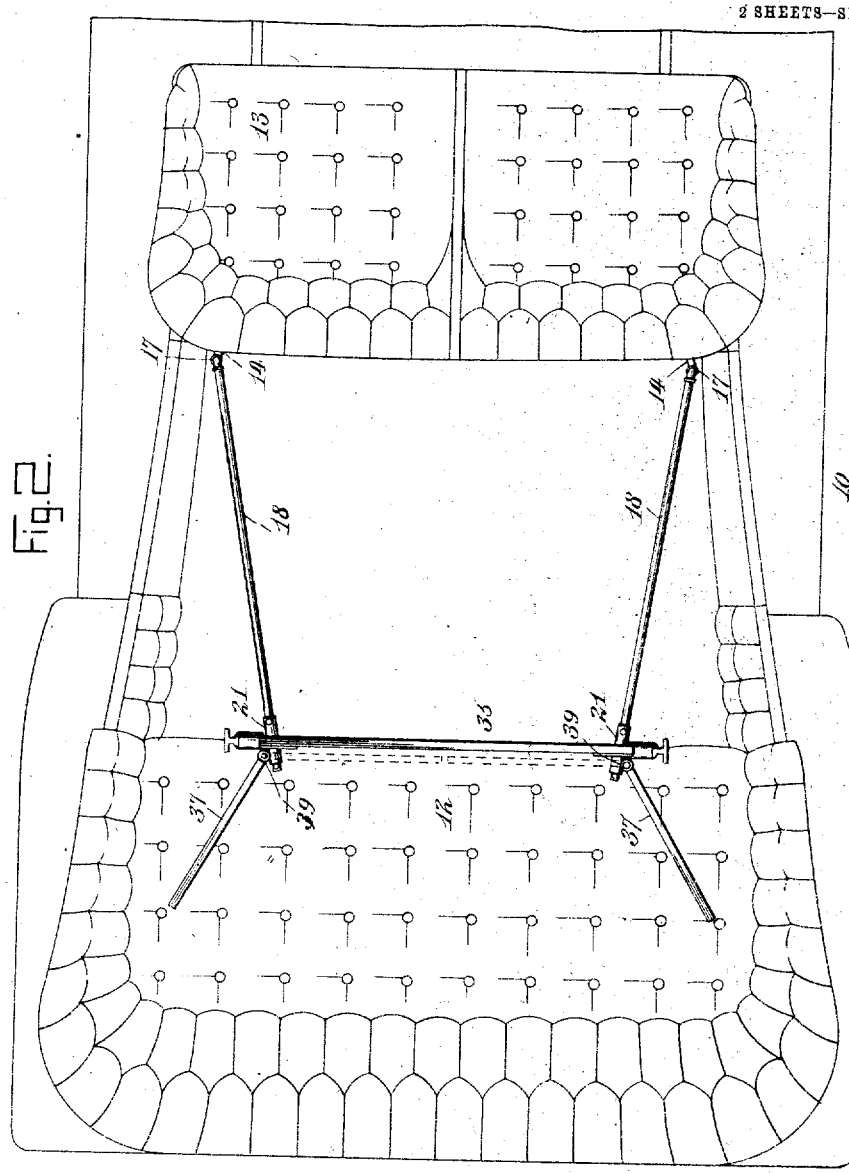
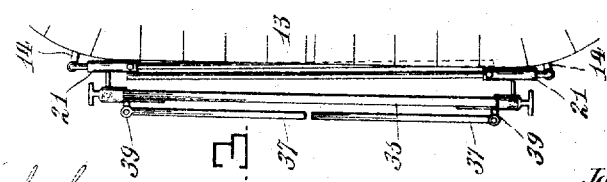
WITNESSES
INVENTOR
John O. Hofbauer
BY
ATTORNEYS

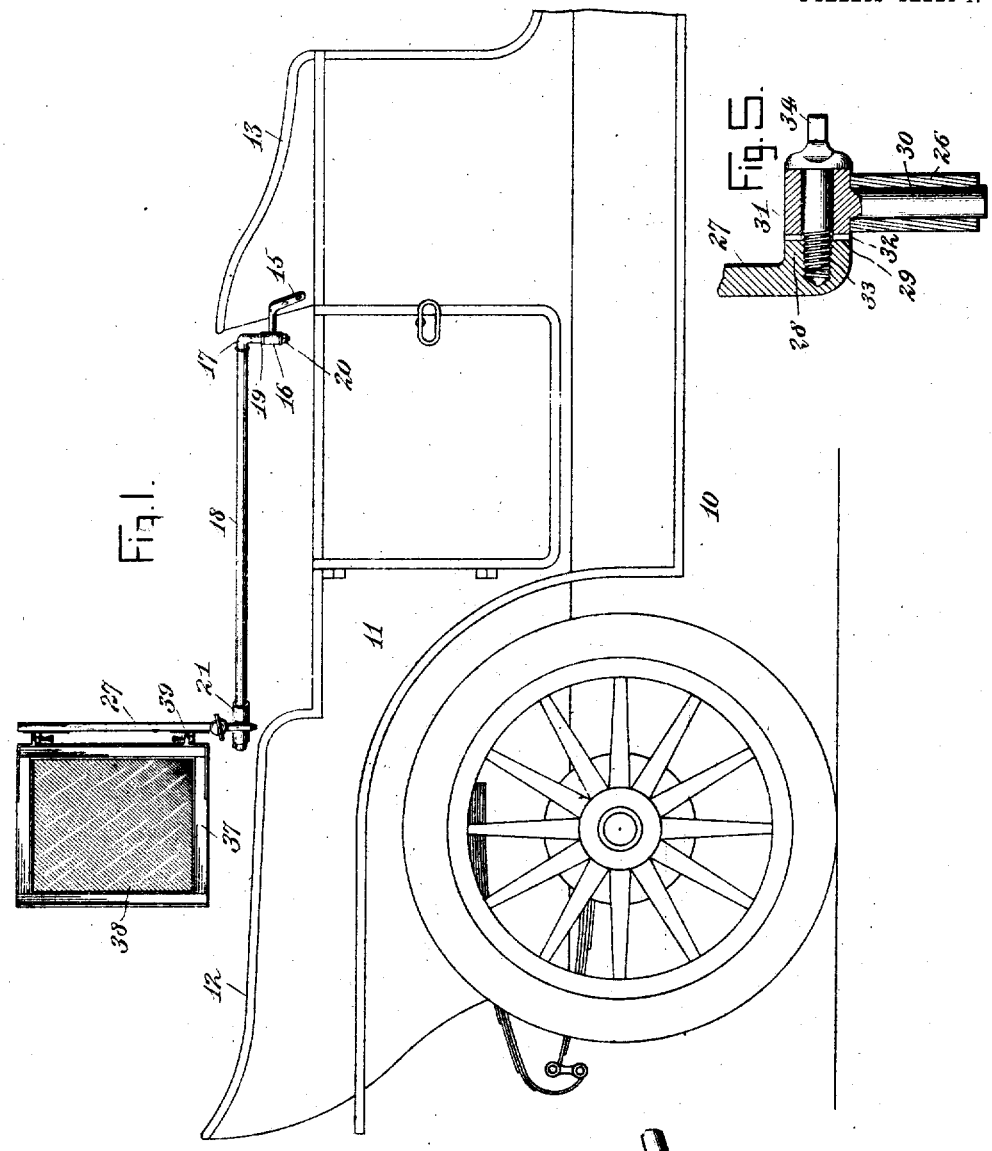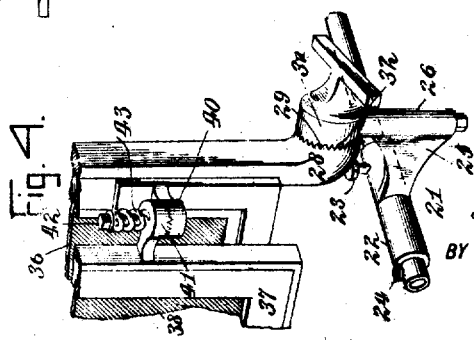

UNITED STATES PATENT OFFICE.

JOHN O. HOFBAUER, OF NEW YORK, N. Y.

WIND-SHIELD.

1,018,973.   Specification of Letters Patent.   Patented Feb. 27, 1912.

Application filed February 10, 1911. Serial No. 607,766.

*To all whom it may concern:*

Be it known that I, JOHN O. HOFBAUER, a citizen of the United States, and a resident of the city of New York, borough of Manhattan, in the county and State of New York, have invented new and useful Improvements in Wind-Shields, of which the following is a full, clear, and exact description.

This invention relates to wind shields for automobiles and other vehicles, and has reference more particularly to the combination with a vehicle having a front seat and a back seat, of a wind shield mounted adjacent to the front seat, and movable into an operative position relative to the rear seat, the wind shield being movable into an inoperative position toward the front seat.

The object of the invention is to provide a simple, strong and durable wind shield for use with motor or other vehicles, which serves to protect the occupants of the rear seat of the vehicle against wind and dust; which can be folded into compact form adjacent to the front seat of the vehicle, so that it is out of the way, and cannot hinder the ingress or egress of the passengers, which can be arranged in a plurality of adjustments, which can be easily and quickly manipulated, and which does not detract from the appearance of the vehicle.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an automobile having an embodiment of my invention applied thereto; Fig. 2 is a plan view of the body of an automobile, showing the wind shield in operative position; Fig. 3 is a plan view of the rear portion of the front seat of the vehicle, showing the wind shield folded against the seat, in an inoperative position; Fig. 4 is an enlarged, fragmentary, perspective view, showing certain of the details of construction of the wind shield; and Fig. 5 is an enlarged, fragmentary section, showing certain of the details of construction.

Before proceeding to a more detailed explanation of my invention, it should be clearly understood, that the wind shield is particularly designed for use at the back seat of the tonneau or body of an automobile or like vehicle. Wind shields for the front seats of automobiles are commonly employed today, but these wind shields afford practically no protection to the occupants of the rear seats, as the wind is deflected over, and passes beyond the front wind shields, and blows directly against the occupants of the rear seats. My wind shield, however, is so constructed that it can be positioned directly in front of the occupants of the rear seats of an automobile and thus serves to protect them effectively, against wind, dust, rain and the like.

Certain of the details of construction, shown for example, herewith, form no part of the invention, and can be varied in accordance with individual preference and special conditions, without deviating from the essence of the invention as defined in the appended claims.

Referring more particularly to the drawings, I have shown for example, herewith, an automobile 10, having a body 11 in which is located the rear seat 12, behind the front seat 13, in the usual manner. At the rear of the front seat, near the ends thereof, are mounted L-shaped brackets 14, secured in place by means of screws 15, or in any other suitable manner. Each bracket has at the end, a substantially vertical sleeve 16, in which is pivotally mounted the downwardly disposed end 17 of a supporting rod 18. The end 17 has a retaining flange or collar 19, and at the extremity, a securing nut 20. The supporting rods can swing freely, in horizontal planes, into position against the back of the front seat, but extending outwardly therefrom, toward the rear seat. Upon each of the supports or rods is adjustably mounted a slide 21, comprising a sleeve 22 having a set-screw 23, by means of which it can be clamped securely upon the rod at any point thereof. At the end of each rod is a screw or stud 24, constituting a stop, to prevent the slide from being displaced from the rod. Rigid with each sleeve 22 is a laterally extended arm 25 having at the end a vertically disposed, tubular extension 26. A supporting arm or bar 27 is associated with each slide, having at the lower end an outwardly disposed part 28 provided with teeth or serrations 29. A rod or pin 30 is located in each tubular extension 26, and has at the upper end a part 31 provided with teeth or serrations 32 corresponding to those of the arms 27. A holding screw 33 is received in threaded openings of the part 31, and the end 28 of the arm, and has a head 34 constituting a grip, by means of which it can be manipulated.

Between the arms 27 is secured in any suitable manner, a frame 35 having glass or other transparent material 36 therein, and constituting the main shield of the device. When the parts are extended, the main shield is positioned directly in front of, and preferably centrally disposed with respect to the rear seat, as is shown most clearly in Fig. 2. At each side of the main shield are positioned auxiliary or lateral shields consisting of suitable frames 37 having glass or other transparent material 38 mounted therein. The frames of the auxiliary shields are secured to the frame of the main shield, by means of hinges 39. These consist of hinge members 40 and 41 having serrated engaging surfaces, and pivotally connected by means of a bolt 42. A spring 43 tends to hold together the members of each hinge. These hinges permit the auxiliary shields to be positioned in any desired angular relation with respect to the main shield and to be held in such positions.

When the wind shield is in an operative position, the main shield is positioned in front of the rear seat, and the auxiliary or lateral shields are disposed at the sides, as desired. When the wind shield is not required, the set-screws 23 are loosened, so that the slides can move along the supports 18. One of these is then folded inwardly against the front seat, and the other is subsequently folded inwardly, as is shown in Fig. 3. This positions the main shield adjacent to the back of the front seat. The auxiliary shields are then folded inwardly against the main shield. The entire device thus requires very little room when not in use.

Having thus described my invention, I claim as new, and desire to secure by Letters Patent:

1. In combination, a pair of relatively movable rods, a fixed, pivotal support for each of said rods, sleeves slidably mounted upon said rods and movable longitudinally thereof, a wind shield, and means for pivotally and adjustably mounting said wind shield upon said sleeves, the distance between said fixed supports exceeding the length of said wind shield.

2. In combination, a pair of independently and relatively movable rods, a fixed pivot support for each of said rods, whereby the same can swing in a horizontal plane, a sleeve slidably mounted upon each of said rods, and movable longitudinally thereof, each of said rods having at the free end a stop to limit the movement of its sleeve, each of said sleeves having a vertical pivot, an arm adjustably carried by each of said vertical pivots, a wind shield secured between said arms, and an auxiliary wind shield mounted adjacent to each end of said first wind shield and foldable against the same, the distance between said fixed pivot supports exceeding the normal distance between said sleeves.

In testimony whereof I have signed my name to this specification in the presence of two subscribing witnesses.

JOHN O. HOFBAUER.

Witnesses:
John K. Brachvogel,
Philip D. Rollhaus.